United States Patent
Kawamura et al.

(10) Patent No.: US 10,757,448 B2
(45) Date of Patent: Aug. 25, 2020

(54) BITSTREAM TRANSFORMATION APPARATUS, BITSTREAM TRANSFORMATION METHOD, DISTRIBUTION SYSTEM, MOVING IMAGE ENCODING APPARATUS, MOVING IMAGE ENCODING METHOD AND COMPUTER-READABLE STORAGE MEDIUM

(71) Applicant: KDDI CORPORATION, Tokyo (JP)

(72) Inventors: Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 51 days.

(21) Appl. No.: 16/010,870

(22) Filed: Jun. 18, 2018

(65) Prior Publication Data

US 2018/0302652 A1 Oct. 18, 2018

Related U.S. Application Data

(63) Continuation of application No. PCT/JP2016/069861, filed on Jul. 5, 2016.

(30) Foreign Application Priority Data

Dec. 28, 2015 (JP) ................... 2015-256488

(51) Int. Cl.
*H04N 19/70* (2014.01)
*H04N 19/513* (2014.01)
(Continued)

(52) U.S. Cl.
CPC ........... *H04N 19/70* (2014.11); *H04N 19/122* (2014.11); *H04N 19/132* (2014.11); *H04N 19/33* (2014.11);
(Continued)

(58) Field of Classification Search
None
See application file for complete search history.

(56) References Cited

U.S. PATENT DOCUMENTS

| 10,230,968 B2 | 3/2019 | Nakagami et al. |
| 2006/0133502 A1 | 6/2006 | Lee et al. |

(Continued)

FOREIGN PATENT DOCUMENTS

| EP | 0838955 A2 | 4/1998 |
| JP | 2015-076765 A | 4/2015 |

(Continued)

OTHER PUBLICATIONS

ITU-T H.265, International Telecommunication Union, Telecommunication Standardization Sector of ITU, "High Efficiency Video Coding" (Apr. 2015). pp. 1-610.

(Continued)

*Primary Examiner* — Xiaolan Xu
(74) *Attorney, Agent, or Firm* — Fitch, Even, Tabin & Flannery LLP

(57) ABSTRACT

An apparatus comprises: a unit that analyzes syntax of a bitstream corresponding to moving image data for which a minimum size of a unit according to decoding processing is defined and syntax of an accompanying bitstream that accompanies the bitstream; a unit that transforms high-level syntax obtained as a result of the analysis into new high-level syntax including a resolution that is lower than a resolution that the high-level syntax includes; a unit that transforms information which is obtained as a result of the analysis and is associated with a minimum size unit in the bitstream into information associated with a corresponding unit in the accompanying bitstream; and a unit that synthe- (Continued)

sizes, in accordance with syntax, the new high-level syntax and information after the transformation, and that generates a new bitstream.

11 Claims, 11 Drawing Sheets

(51) Int. Cl.
  *H04N 19/33* (2014.01)
  *H04N 19/59* (2014.01)
  *H04N 19/122* (2014.01)
  *H04N 19/132* (2014.01)
  *H04N 19/48* (2014.01)

(52) U.S. Cl.
  CPC ........... *H04N 19/48* (2014.11); *H04N 19/513* (2014.11); *H04N 19/59* (2014.11)

(56) References Cited

U.S. PATENT DOCUMENTS

2015/0264404 A1* 9/2015 Hannuksela ........... H04N 19/70
  375/240.16
2016/0301941 A1   10/2016 Chono et al.

FOREIGN PATENT DOCUMENTS

| JP | 2015186028 A | 10/2015 |
| WO | 2005099275 A2 | 10/2005 |
| WO | 2015033510 A1 | 3/2015 |

OTHER PUBLICATIONS

EPO; Application No. 16881462.2; Extended European Search Report dated Dec. 4, 2018.
JPO; Japanese Patent Application No. 2015-256488; Japanese Office Action dated May 14, 2018.

* cited by examiner

BITSTREAM TRANSFORMATION APPARATUS, BITSTREAM TRANSFORMATION METHOD, DISTRIBUTION SYSTEM, MOVING IMAGE ENCODING APPARATUS, MOVING IMAGE ENCODING METHOD AND COMPUTER-READABLE STORAGE MEDIUM

This application is a continuation of International Patent Application No. PCT/JP2016/069861 filed on Jul. 5, 2016, and claims priority to Japanese Patent Application No. 2015-256488 filed on Dec. 28, 2015, the entire content of both of which is incorporated herein by reference.

TECHNICAL FIELD

The present invention relates to a bitstream transformation apparatus, a bitstream transformation method, a distribution system, a moving image encoding apparatus, a moving image encoding method, and a computer-readable storage medium.

BACKGROUND OF THE INVENTION

A moving image coding scheme that uses intra-prediction (intra-frame prediction), inter-prediction (inter-frame prediction), residual difference transformation, and entropy encoding has been proposed (for example, refer to NPTL1). Also, a magnification method for an encoding apparatus/decoding apparatus called a scalable encoding scheme has been proposed (for example, refer to NPTL1).

In recent years, high-resolution video such as 4K video and 8K video has come to be distributed. 4K video is being distributed at 15 Mbps to 35 Mbps in video distribution services. Meanwhile, 8K video broadcasting services are envisioned to be at 90 Mbps to 110 Mbps. With HD video (2K video) thus far, it has been possible to realize a practical quality at about 3 Mbps to 6 Mbps by HEVC (High Efficiency Video Coding).

When such video is envisioned to be streamed and stored, ten times or more the capacity is required for 4K/8K video over 2K video. In particular, since there is a storage cost in individually storing 4K video and 8K video, there is great benefit in reducing capacity by scalable encoding techniques such is described in NPTL1.

CITATION LIST

Non-Patent Literature

[NPTL1] ITU-T H.265 High Efficiency Video Coding.

SUMMARY OF INVENTION

Technical Problem

However, in conventional HEVC scalable encoding/decoding techniques, encoding apparatus and decoding apparatus configurations have multiple loops, and so the amount of processing is large.

The present invention is made in light of such a problem, and it has as an object to provide a technique by which it is possible to suppress an increase in processing amount in an encoding apparatus or a decoding apparatus while realizing scalability.

Solution to Problem

One aspect of the present invention is related to a bitstream transformation apparatus. This bitstream transformation apparatus comprises a syntax analysis unit that analyzes syntax of a bitstream corresponding to moving image data for which a minimum size of a unit according to decoding processing is defined and syntax of an accompanying bitstream that accompanies the bitstream; a high-level syntax transformation unit that transforms high-level syntax obtained as a result of the analysis by the syntax analysis unit into new high-level syntax including a resolution that is lower than a resolution that the high-level syntax includes; a unit transformation unit that transforms information which is obtained as a result of the analysis by the syntax analysis unit and is associated with a minimum size unit in the bitstream into information associated with a corresponding unit in the accompanying bitstream; and a syntax synthesizing unit that synthesizes, in accordance with syntax, the new high-level syntax from the high-level syntax transformation unit and information after the transformation in the unit transformation unit, and that generates a new bitstream.

Another aspect of the present invention is a moving image encoding apparatus. This moving image encoding apparatus comprises a transformation quantization unit that, for an image to be encoded which is divided into a plurality of blocks, transforms and quantizes a difference signal between the image and a prediction image in block units, and generates a first level value (a transform coefficient); an encoding unit that entropy encodes the first level value generated by the transformation quantization unit, and generates a bitstream; and a downsampling unit that generates, from a block of a size that is larger than a minimum size, a minimum size block of a resolution lower than a resolution of the image. The transformation quantization unit generates a second level value by transforming and quantizing a difference signal of a block generated by the downsampling unit. The encoding unit entropy encodes a second level value generated by the transformation quantization unit, and generates an accompanying bitstream.

Additionally, any combination of the above configuration elements and substitutes for the configuration elements and expressions of the present invention between an apparatus, a method, a system, a computer program, a storage medium storing a computer program or the like may be embodiments of the present invention.

Advantageous Effects of Invention

By virtue of the present invention, it is possible to suppress the increase in processing amount in an encoding apparatus or a decoding apparatus while realizing scalability. Further features and advantages of the present invention will become apparent from the following description with reference to the attached drawings.

DESCRIPTION OF EMBODIMENTS

Figure 1:
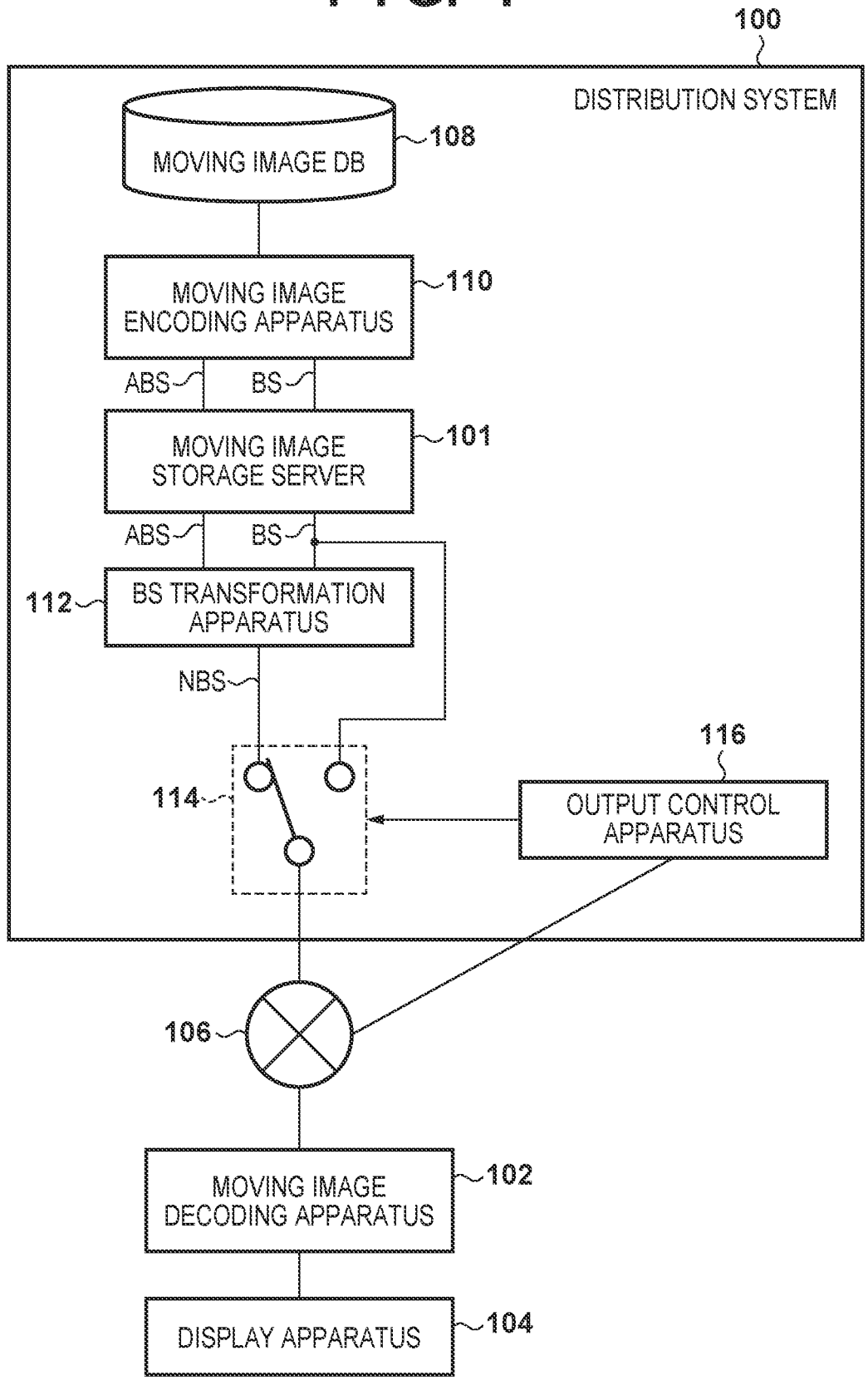
FIG. 1 is a schematic diagram illustrating a configuration of a distribution system according to an embodiment.

Hereinafter, the same reference numerals are given in the drawings to configuration elements, members, processes, and signals that are the same or equivalent, and duplicate descriptions are omitted as appropriate. Also, portions of components that are not important to the description are abbreviated in the drawings.

In embodiments, scalability in syntax is realized by using a feature that various transformation sizes are defined in H.265 and ISO/IEC 23008-2 HEVC. A case is considered in which the resolution is changed to be ½ in cases of transforming 8K to 4K, or the like. In order to be able to decode a transformed bitstream with an HEVC-compatible decoder, the bitstream must satisfy the restrictions of H.265. Specifically, in HEVC, a CU (Coding Unit, coding unit) size, a PU (Prediction Unit, prediction unit) size, and a TU (Transform Unit, transform unit) size are respectively restricted to 8 (pixels, same hereinafter)×8 to 64×64, 4×4 to 32×32, and 4×4 to 32×32. Accordingly, when the CU size is less than 16×16 (specifically 8×8), a bitstream for when the image is reduced and the CU size is made to be 8×8 is generated on the encoding side as an accompanying bitstream (accompanying bitstream). Similarly, when the PU size/TU size is less than 8×8 (specifically 4×4), the image is reduced, the accompanying bitstream is generated on the encoding side for when the PU size/TU size is made to be 4×4.

Meanwhile, when the CU size is made to be 16×16 or more and the PU size is made to be 8×8 or more, there is no particular change, and when the TU size is 8×8 or more, only low-frequency component level values are re-encoded. Also, PU motion vector accuracy is made uniform at ¼.

The result of this is that by adding the accompanying bitstream (overhead) to a high-resolution video such as 8K, it is possible to generate a bitstream of low-resolution video that can be decoded by an HEVC-compatible decoder from the bitstream alone.

Note that the change in resolution is not limited to ½, and generally it may be $2^{(-n)}$ (n is a natural number). Also, the accompanying bitstream is referred to as such since it accompanies the bitstream, but it may also be referred to as a supplementary bitstream (supplementary bitstream, complementary bitstream), and what is added to the bitstream may be referred to as an additional bitstream (additional bitstream).

FIG. 1 is a schematic diagram illustrating a configuration of a distribution system 100 according to an embodiment. The distribution system 100 is a system that is used in a video distribution service that distributes high-resolution video such as 4K video or 8K video. A video distribution service may be VOD (Video On Demand), for example. The distribution system 100 is connected, via a network 106 such as the Internet, to a moving image decoding apparatus 102 such as a set-top box or a personal computer that is installed at a user site. The moving image decoding apparatus 102 is connected to a display apparatus 104 such as a television receiver or a monitor. The moving image decoding apparatus 102 is an HEVC-compatible decoder.

Note that the distribution system in the video distribution service is only one example, and it will be clear to a person having ordinary skill in the art who has come into contact with the present specification that it is possible to apply the technical concept according to the present embodiment to any system or service that includes a moving image encoder or decoder.

The distribution system 100 receives via the network 106, from a user, a designation of moving image content that he or she wishes to view. The distribution system 100 generates a bitstream by encoding moving image content data that was designated. The distribution system 100 transmits the generated bitstream to the moving image decoding apparatus 102 of the user which is the request source via the network 106. The moving image decoding apparatus 102 decodes the received bitstream to generate moving image data, and transmits it to the display apparatus 104. The display apparatus 104 processes the received moving image data, and outputs the designated moving image content.

The distribution system 100 comprises a moving image DB (database) 108, a moving image encoding apparatus 110, a moving image storage server 101, a BS (bitstream) transformation apparatus 112, a selection unit 114, and an output control apparatus 116. A moving image DB 108 holds high-resolution moving image data such as 4K video and 8K video. The moving image encoding apparatus 110 obtains from the moving image DB 108 moving image data that corresponds to the designated moving image content, encodes the obtained moving image data, and generates a bitstream BS and an accompanying bitstream ABS that accompanies it. The bitstream BS is equivalent to a bitstream that is obtained by encoding obtained moving image data by using a conventional HEVC-compatible encoder. Accordingly, the bitstream BS can be decoded by an HEVC-compatible decoder such as the moving image decoding apparatus 102. Meanwhile, the accompanying bitstream ABS corresponds to data obtained by downsampling a portion of the obtained moving image data. Accordingly, it is not possible to decode only the accompanying bitstream ABS by the moving image decoding apparatus 102. The moving image storage server 101 stores the bitstream BS and the accompanying bitstream ABS generated by the moving image encoding apparatus 110.

A BS transformation apparatus 112 transforms the bitstream BS which comprises high-resolution video and the accompanying bitstream ABS which accompanies it into a new bitstream NBS of low-resolution video. The BS transformation apparatus 112 obtains the bitstream BS and the accompanying bitstream ABS that are being stored in the moving image storage server 101. The BS transformation apparatus 112 processes the obtained the bitstream BS and accompanying bitstream ABS at a syntax level, and generates a new bitstream NBS corresponding to moving image data for which the resolution of the moving image data corresponding to the bitstream BS is lowered. For example, when the bitstream BS corresponds to 8K moving image data, the new bitstream NBS corresponds to 4K moving image data. The new bitstream NBS can be decoded by the moving image decoding apparatus 102.

Hereinafter, description will be given of a case in which the resolution of moving image data that is obtained from the moving image DB 108 and inputted into the moving image encoding apparatus 110 is 8K, and the resolution of the moving image data corresponding to the new bitstream NBS is 4K, specifically a case where the resolution is made to be ½. It will be obvious to a person having ordinary skill in the art who comes into contact with the present specification how to extend the configuration described in the present embodiment to the case where the resolution is made to be $2^{(-n)}$.

The selection unit 114 selects one from among the new bitstream NBS generated by the BS transformation apparatus 112 and the bitstream BS stored in the moving image storage server 101, and transmits the selected bitstream to the moving image decoding apparatus 102 via the network 106.

The output control apparatus 116 controls the selection unit 114. The user, when designating the moving image content he or she wishes to view, designates the resolution considering the display capabilities of the display apparatus 104. The output control apparatus 116 obtains the designated resolution via the network 106. The output control apparatus 116 controls the selection unit 114 such that moving image data of the obtained resolution is outputted from the selection unit 114. For example, if the designated resolution is 8K, the output control apparatus 116 causes the selection unit 114 to select the bitstream BS, and if the designated resolution is 4K, causes the new bitstream NBS to be selected. The result of this is that the selection unit 114, when there is a request from the user that 4K resolution—the lower out of 8K and 4K—is desired, selects the new bitstream NBS generated by the BS transformation apparatus 112.

Figure 2:
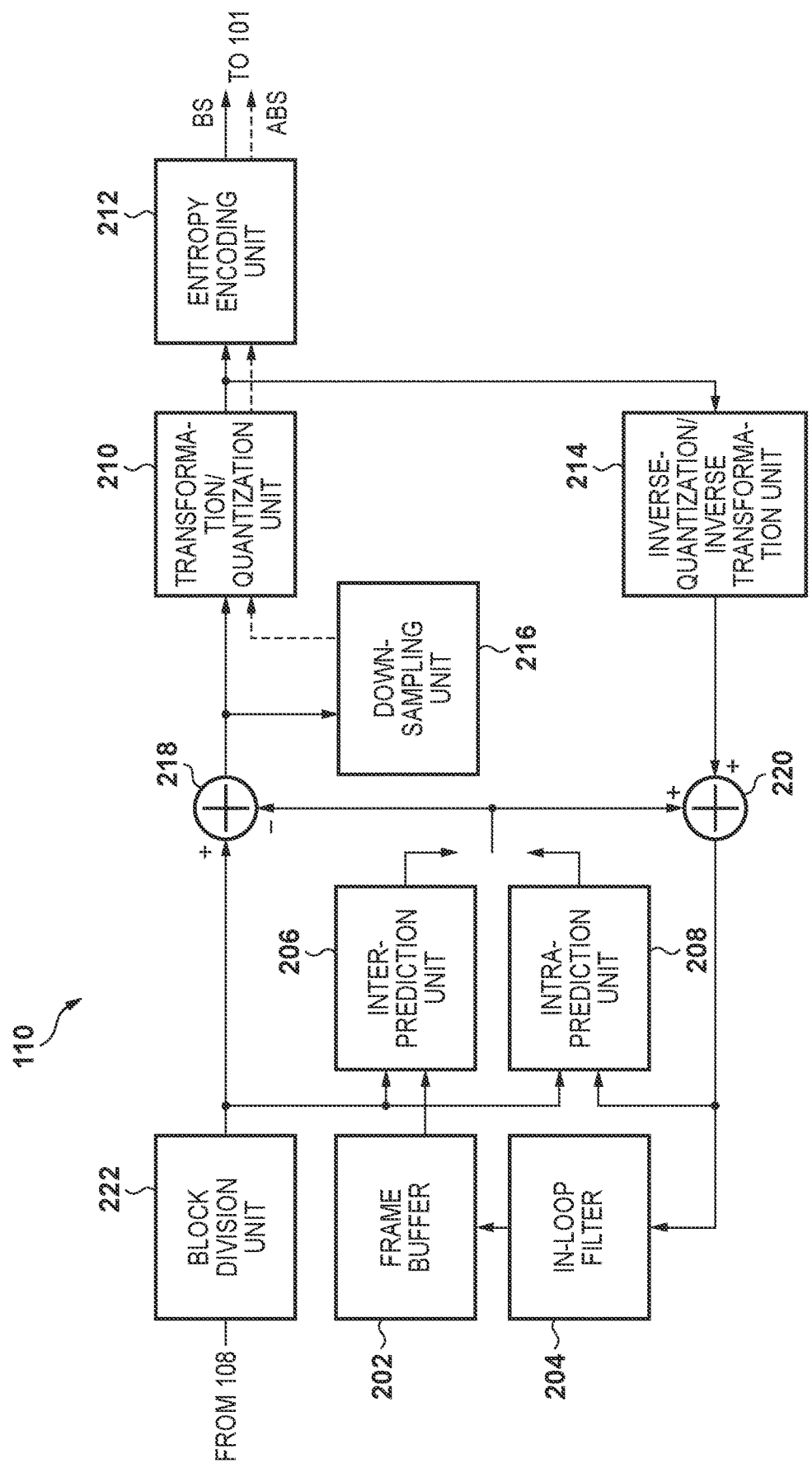
FIG. 2 is a block diagram illustrating functions and configurations of a moving image encoding apparatus of FIG. 1.

FIG. 2 is a block diagram illustrating functions and configurations of the moving image encoding apparatus 110 of FIG. 1. Each block illustrated here can be implemented in hardware with elements such as a CPU of a computer and mechanical apparatuses, or implemented in software by a computer program or the like, but here functional blocks realized by cooperation therebetween are illustrated. Accordingly, a person having ordinary skill in the art who has come into contact with the present specification will understand that these functional blocks can be realized in various forms by combining hardware and software. The computer program that realizes the moving image encoding apparatus 110 may be stored in a non-transitory computer-readable storage medium or may be distributed via a network.

The moving image encoding apparatus 110 comprises a frame buffer 202, an in-loop filter 204, an inter-prediction unit 206, an intra-prediction unit 208, a transformation/quantization unit 210, an entropy encoding unit 212, an inverse-quantization/inverse-transformation unit 214, a downsampling unit 216, a subtraction unit 218, an addition unit 220, and a block division unit 222.

The block division unit 222 divides an image to be encoded which includes moving image data from the moving image DB 108, specifically a frame, into a plurality of blocks. There are various sizes of the blocks, and a plurality of blocks have a quadtree structure. Division into image blocks in the block division unit 222 conforms to HEVC division into image blocks. Specifically, the size of the CTU (Coding Tree Unit) whose processing size is largest is 64×64, and there are the sizes 32×32, 16×16, and 8×8 which result from repeatedly dividing this into four. The block division unit 222 outputs a processing target block to the subtraction unit 218, the inter-prediction unit 206, and the intra-prediction unit 208.

Also, CTUs, CUs, PUs, and TUs are units based upon which encoding processing in the moving image encoding apparatus 110 and decoding processing in the moving image decoding apparatus 102 is performed, and their respective minimum sizes are defined to be 8×8, 8×8, 4×4, and 4×4.

Image data of a previous frame is inputted into the inter-prediction unit 206 from the frame buffer 202. The inter-prediction unit 206, based on the previous frame, outputs a prediction block for the processing target block in accordance with inter-frame prediction. Image data of a block that is already processed of the same frame as the processing target frame is inputted into the intra-prediction unit 208 from the addition unit 220. The intra-prediction unit 208, based on another block of the same frame as the processing target block, outputs the prediction block of the processing target block. Either the output of the inter-prediction unit 206 or the output of the intra-prediction unit 208 is outputted to the subtraction unit 218 depending on whether inter-frame prediction is applied or intra-frame prediction is applied to the processing target block.

The subtraction unit 218 generates a difference (residual) signal for between the block unit encoding target image and the intra-prediction image or the inter-prediction image. The subtraction unit 218 outputs a difference signal indicating a difference between the processing target block and the prediction block that the inter-prediction unit 206 or the intra-prediction unit 208 outputted. The transformation/quantization unit 210 transforms (for example, an orthogonal transform) and quantizes the difference signal in block units and thereby generates first level values. The transformation/quantization unit 210 outputs generated first level values to the entropy encoding unit 212 and the inverse-quantization/inverse-transformation unit 214. The entropy encoding unit 212 entropy encodes the first level values generated by the transformation/quantization unit 210 and side information (not shown) and generates a bitstream BS. Note that the side information is information required for reconstruction of pixel values that is used in the decoding apparatus, and includes related information such as a prediction mode indicating whether intra-prediction or inter-prediction was used, motion vectors, a quantization parameter, and block size.

The inverse-quantization/inverse-transformation unit 214 generates a difference signal by performing processing that is inverse to the processing in the transformation/quantization unit 210. The addition unit 220 generates a processing target block by adding the difference signal that the inverse-quantization/inverse-transformation unit 214 outputs and the prediction block that the inter-prediction unit 206 or the intra-prediction unit 208 outputs, and outputs it to the intra-prediction unit 208 and the in-loop filter 204. The in-loop filter 204 generates a locally-decoded image corresponding to that frame and outputs it to the frame buffer 202. This locally-decoded image is used in inter-frame prediction in the inter-prediction unit 206.

The downsampling unit 216 generates, from a transformation block whose size is larger than a minimum size, a transformation block of a minimum size whose resolution (specifically, 4K) is lower than the resolution (specifically, 8K) of the image to be encoded. The downsampling unit 216 obtains an intra/inter prediction difference signal outputted from the subtraction unit 218 in transformation block units. The downsampling unit 216 specifies the size of the transformation block of the obtained intra/inter prediction difference signal. The downsampling unit 216, in a case where the specified size is greater than the minimum size (4×4), reduces a transformation block to a minimum size, and outputs the transformation block that was reduced to the minimum size. For example, only when the specified size is 8×8 and the transformation block thereof is divided into 4×4, the downsampling unit 216 outputs such a transformation block as a transformation block that is reduced to 4×4. Alternatively, the downsampling unit 216 may reconstruct an 8×8 block by collecting together four 4×4 transformation blocks that were generated by quadtree division of the 8×8 transformation block. The downsampling unit 216 may reduce a reconstructed 8×8 block to 4×4. The 4×4 transformation block outputted from the downsampling unit 216 is equivalent to the minimum size transformation block when the resolution of the image to be encoded is reduced to 4K.

The transformation/quantization unit 210 generates second level values by obtaining a transformation block of a minimum size generated by the downsampling unit 216, and transforming and quantizing the obtained transformation block. The entropy encoding unit 212 entropy encodes the second level values generated by the transformation/quantization unit 210 and generates an accompanying bitstream ABS. Also, the entropy encoding unit 212 takes level values and an intra-prediction mode (not shown) as input, and outputs the bitstream BS or the accompanying bitstream ABS. In this way, the reduced 4×4 block is encoded. The bitstream BS corresponds to an encoding-target image whose resolution is 8K, and the accompanying bitstream ABS accompanying this bitstream BS includes information related to the minimum size CU, PU, and TU of a 4K image for which the resolution of the encoding-target image is made to be ½.

Figure 3:
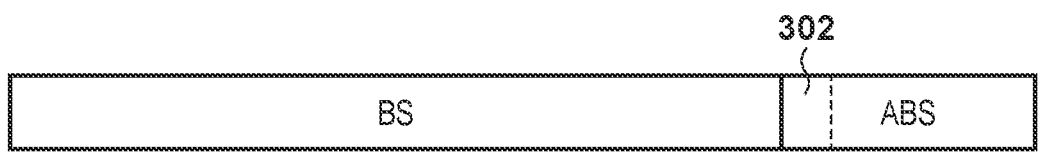
FIG. 3 is a schematic diagram illustrating an example of a structure of a bitstream and an accompanying bitstream.

FIG. 3 is a schematic diagram illustrating an example of a structure of the bitstream BS and the accompanying bitstream ABS. The accompanying bitstream ABS accompanies the bitstream BS. The accompanying bitstream ABS may have a header 302 for identifying the accompanying bitstream ABS. The moving image encoding apparatus 110 may output the bitstream BS and the accompanying bitstream ABS together as one bitstream.

The bitstream BS includes information other than a video encoding layer (video coding layer) (for example, VUI (Video Usability Information) an SPS (Sequence Parameter Set), a PPS (Picture Parameter Set), and the like, referred to as high-level syntax), a slice header, CU information, PU information, and TU information. The slice header is assumed to be included in the high-level syntax. Information related to block division and an intra-prediction mode is stored in the CU information. Information related to motion vectors is stored in the PU information. Level values are stored in the TU information. The accompanying bitstream ABS has a similar configuration to the bitstream BS.

Figure 4:
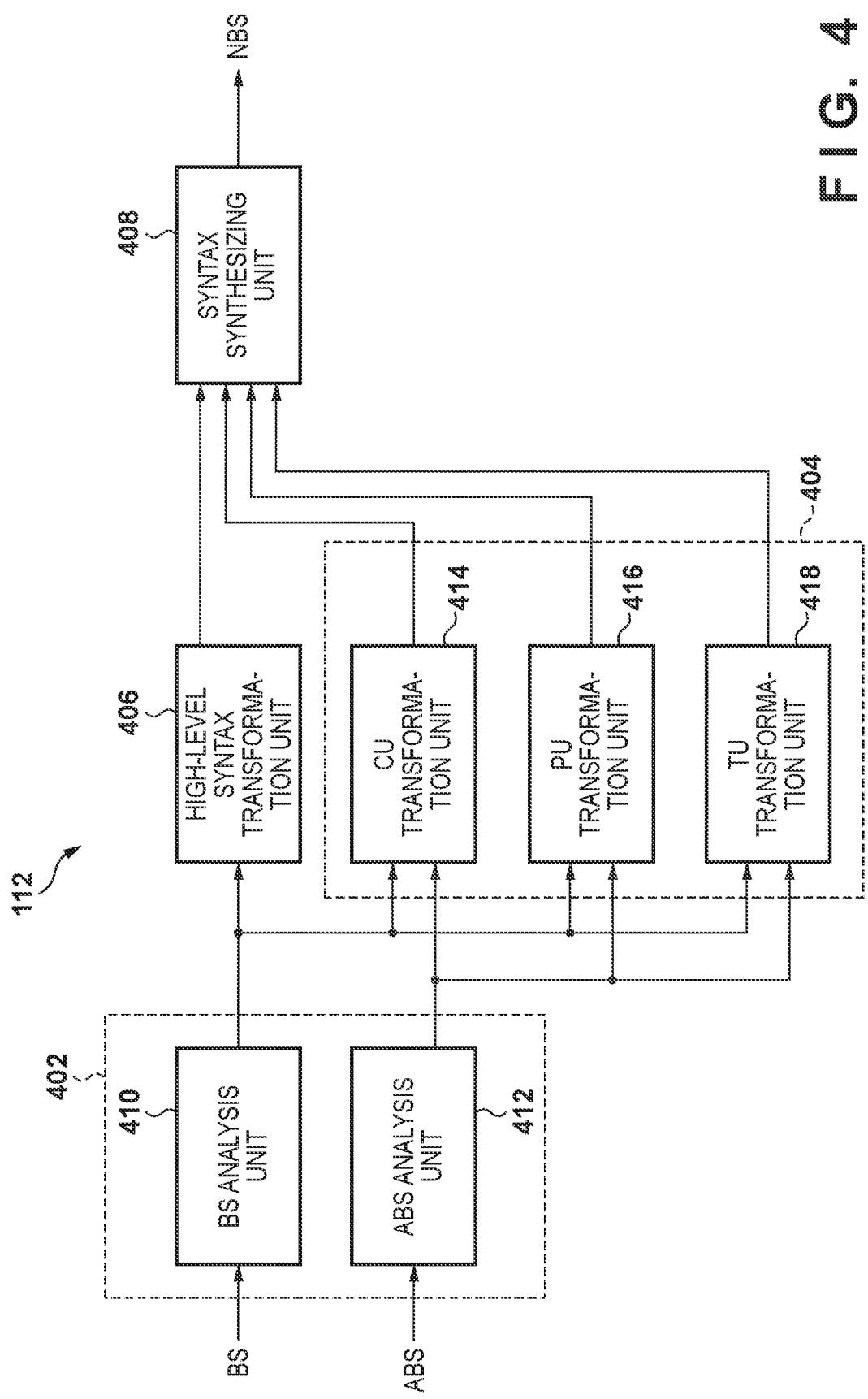
FIG. 4 is a block diagram illustrating functions and configurations of a BS transformation apparatus of FIG. 1.

FIG. 4 is a block diagram illustrating functions and configurations of the BS transformation apparatus 112 of FIG. 1. Each block illustrated here can be implemented in hardware with elements such as a CPU of a computer and mechanical apparatuses, or implemented in software by a computer program or the like, but here functional blocks realized by cooperation therebetween are illustrated. Accordingly, a person having ordinary skill in the art who has come into contact with the present specification will understand that these functional blocks can be realized in various forms by combining hardware and software. A computer program that realizes the BS transformation apparatus 112 may be stored in a non-transitory computer-readable storage medium or may be distributed via a network.

The BS transformation apparatus 112 comprises a syntax analysis unit (Parser) 402, a unit transformation unit 404, a high-level syntax transformation unit (High Level Syntax Converter) 406, and a syntax synthesizing unit (Synthesis) 408. The syntax analysis unit 402 analyzes the syntax of bitstream BS and the syntax of the accompanying bitstream ABS that are being stored in the moving image storage server 101. The syntax analysis unit 402 includes a BS analysis unit 410 and an ABS analysis unit 412. The BS analysis unit 410 obtains the bitstream BS, analyzes the syntax of the bitstream BS, and decomposes the bitstream BS into high-level syntax, CU information, PU information, and TU information. The BS analysis unit 410 outputs the high-level syntax, the CU information, the PU information, and the TU information obtained in the analysis results to a high-level syntax transformation unit 406, a CU transformation unit 414, a PU transformation unit 416, and a TU transformation unit 418. The ABS analysis unit 412 obtains the accompanying bitstream ABS, and analyzes the syntax of the accompanying bitstream ABS. The ABS analysis unit 412 outputs the CU information, the PU information, and the TU information obtained in the analysis results to the CU transformation unit 414, the PU transformation unit 416, and the TU transformation unit 418 respectively.

The high-level syntax transformation unit 406 obtains the high-level syntax outputted from the BS analysis unit 410, and transforms the obtained high-level syntax into new high-level syntax that includes a lower resolution than the resolution included in that high-level syntax. For example, the high-level syntax transformation unit 406 includes in the new high-level syntax a resolution (specifically, 4K) obtained by dividing the resolution included in the obtained high-level syntax (specifically, 8K) by 2. In this way, the resolution of the high-level syntax is changed in the high-level syntax transformation unit 406.

The unit transformation unit 404 includes the CU transformation unit 414, the PU transformation unit 416, and the TU transformation unit 418. The CU transformation unit 414 obtains CU information in the bitstream BS from the BS analysis unit 410. The CU transformation unit 414 obtains CU information in the accompanying bitstream ABS from the ABS analysis unit 412. The CU transformation unit 414 transforms CU information associated with a minimum size (8×8) CU in the CU information in the obtained bitstream BS into the CU information associated with the corresponding minimum size CU in the obtained accompanying bitstream ABS. For example, the CU transformation unit 414 discards the CU information originating in the bitstream BS when the block size is the minimum CU size, and outputs the CU information originating in the accompanying bitstream ABS in its place. The CU transformation unit 414, in a case where the block size is not the minimum CU size, outputs the CU information originating in the bitstream BS as is.

The PU transformation unit 416 obtains PU information in the bitstream BS from the BS analysis unit 410. The PU transformation unit 416 obtains PU information in the accompanying bitstream ABS from the ABS analysis unit 412. The PU transformation unit 416 transforms PU information associated with a minimum size (4×4) PU in the PU information in the obtained bitstream BS into the PU information associated with the corresponding minimum size PU in the obtained accompanying bitstream ABS. For example, the PU transformation unit 416 discards the PU information originating in the bitstream BS when the block size is the minimum PU size, and outputs the PU information originating in the accompanying bitstream ABS in its place. The PU transformation unit 416 transforms at an accuracy according to 4K by making the accuracy (or size) of a motion vector associated with a PU of a size larger than the minimum size in the bitstream BS be ½. At that time, the PU transformation unit 416, after reconstructing a motion vector with ½ the accuracy, re-encodes and outputs the PU information.

The TU transformation unit 418 obtains TU information in the bitstream BS from the BS analysis unit 410. The TU transformation unit 418 obtains TU information in the accompanying bitstream ABS from the ABS analysis unit 412. The TU transformation unit 418 transforms TU information associated with a minimum size (4×4) TU in the TU information in the obtained bitstream BS into the TU information associated with the corresponding minimum size TU in the obtained accompanying bitstream ABS. For example, the TU transformation unit 418 discards the TU information originating in the bitstream BS when the block size is the minimum TU size, and outputs the TU information originating in the accompanying bitstream ABS in its place.

The TU transformation unit 418 generates a collection of level values according to the 4K resolution by extracting low-frequency components from the collection of level values associated with a TU of a block size that is not the minimum TU size, specifically a size that is larger than the minimum TU size. The TU transformation unit 418, in a case where the block size is not the minimum TU size, reconstructs a level value matrix to change the block size, extracts only the level values that configure the low-frequency components, and outputs the TU information. For example, the TU transformation unit 418 reconstructs the level value matrix to halve the block size, extracts the low-frequency half of each row and column, makes the number of level values ¼, and outputs the TU information.

The syntax synthesizing unit 408 synthesizes, in accordance with syntax, the new high-level syntax from the high-level syntax transformation unit 406, the CU information, the PU information, and the TU information after the transformations of the CU transformation unit 414, the PU transformation unit 416, and the TU transformation unit 418 respectively, and generates a new bitstream NB S.

Figure 5:
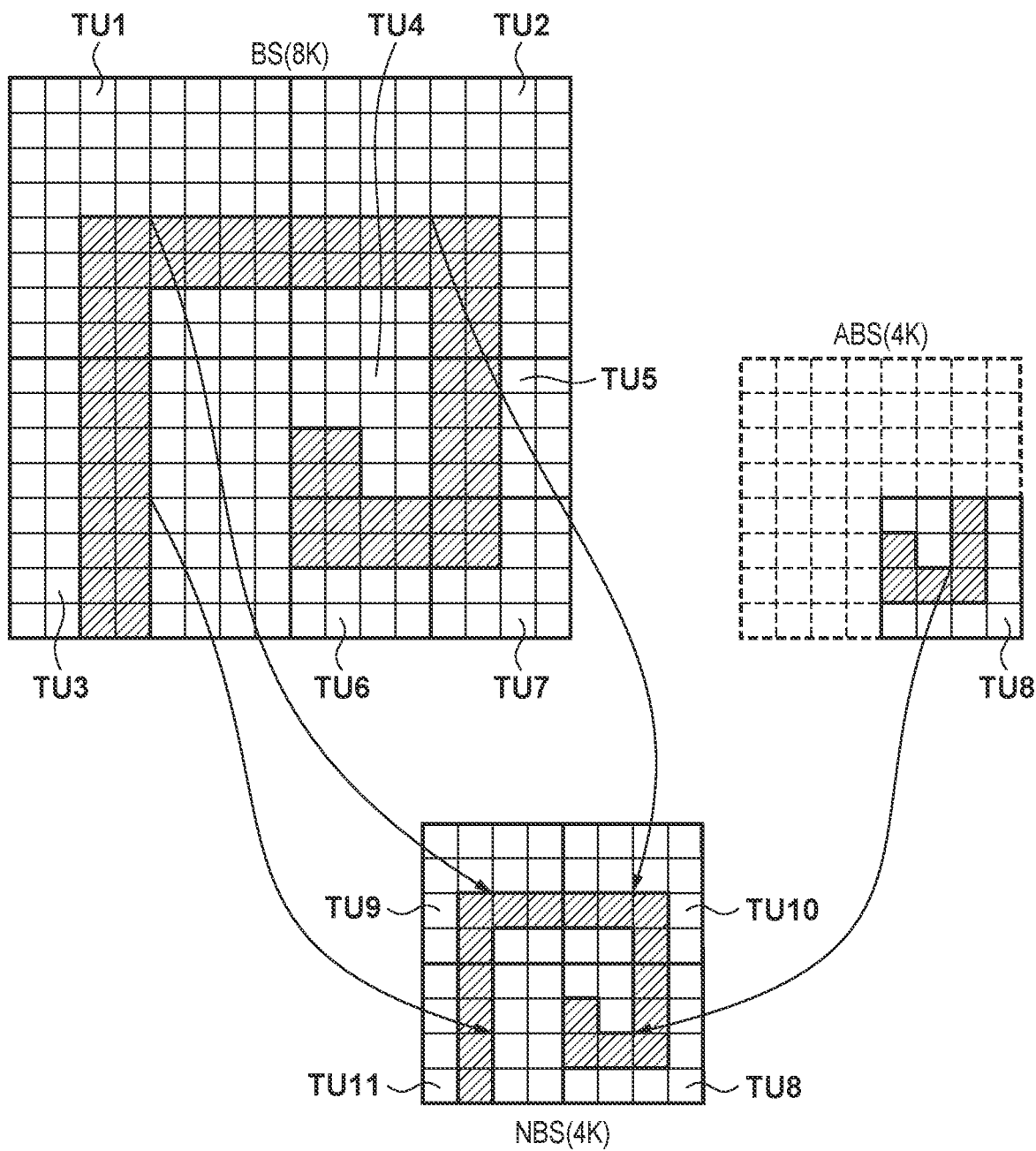
FIG. 5 is a schematic diagram for describing transformation processing in the BS transformation apparatus of FIG. 1.

FIG. 5 is a schematic diagram for describing transformation processing in the BS transformation apparatus 112 of FIG. 1. A 16×16 portion of an 8K image is divided into 8×8 TU1, TU2, and TU3, and 4×4 TU4, TU5, TU6, and TU7. The level values associated respectively with these TU1 to TU7 are encoded, and stored in the TU information of the bitstream BS. Also, by applying downsampling according to the present embodiment to the foregoing 16×16 portion, the 4×4 TU8 is generated. TU4, TU5, TU6, and TU7 collectively correspond to TU8. The level values associated with TU8 are encoded, and stored in the TU information of the accompanying bitstream ABS.

In the TU transformation unit 418, regarding TU1 whose size (8×8) is larger than the minimum TU size (4×4), low-frequency components of TU1 are extracted, and the 4×4 TU9 is generated. Similarly, in the TU transformation unit 418, T2 to TU10 and TU3 to TU11 are respectively generated. TU4, TU5, TU6, and TU7 of the minimum TU size (4×4) are discarded by the TU transformation unit 418, and replaced with TU8 originating in the accompanying bitstream ABS. The level values associated respectively with these TU9, TU10, TU11, and TU8 are encoded, and stored in the TU information of the new bitstream NBS.

Figure 6:
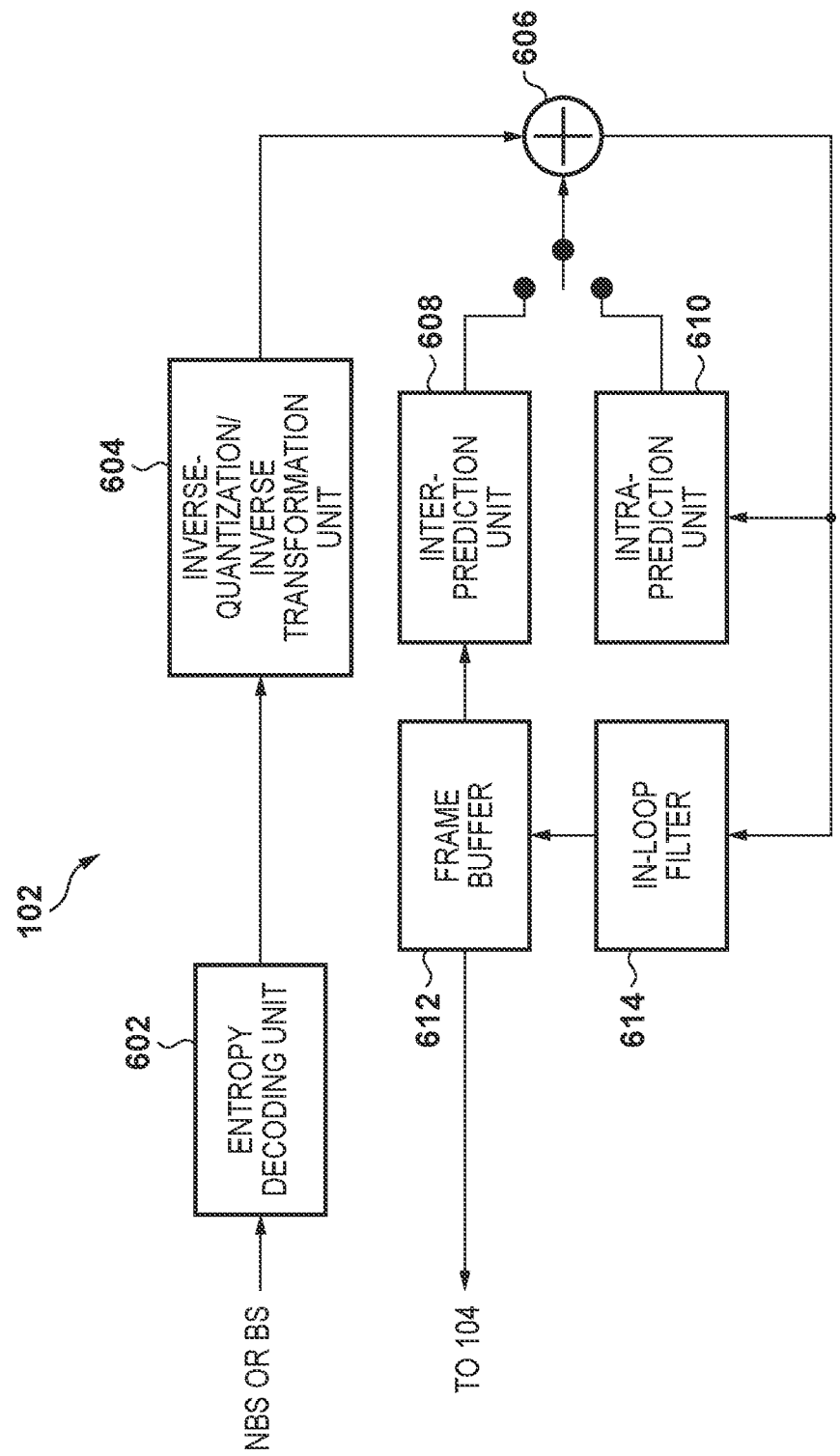
FIG. 6 is a block diagram illustrating functions and configurations of the moving image decoding apparatus of FIG. 1.

FIG. 6 is a block diagram illustrating functions and configurations of the moving image decoding apparatus 102 of FIG. 1. Each block illustrated here can be implemented in hardware with elements such as a CPU of a computer and mechanical apparatuses, or implemented in software by a computer program or the like, but here functional blocks realized by cooperation therebetween are illustrated. Accordingly, a person having ordinary skill in the art who has come into contact with the present specification will understand that these functional blocks can be realized in various forms by combining hardware and software.

The moving image decoding apparatus 102 comprises an entropy decoding unit 602, an inverse-quantization/inverse-transformation unit 604, an addition unit 606, an inter-prediction unit 608, an intra-prediction unit 610, a frame buffer 612, and an in-loop filter 614. The moving image decoding apparatus 102, according to an inverse order to the procedure performed by the moving image encoding apparatus 110, obtains output moving image data from the bitstream BS and the new bitstream NBS.

The entropy decoding unit 602 receives the bitstream BS or the new bitstream NBS from the distribution system 100 via the network 106. The entropy decoding unit 602 entropy-decodes the received bitstream, and retrieves level values and side information. Note that the processing for obtaining the side information and level values from the bitstream is referred to as parse (parse) processing. Reconstruction of the pixel values by using the side information and level values thus obtained is referred to as decoding processing.

The inverse-quantization/inverse-transformation unit 604 inverse-quantizes and inverse-transforms the level values in block units and generates a difference signal. The addition unit 606, in accordance with whether a block corresponding to the difference signal generated by the inverse-quantization/inverse-transformation unit 604 is intra-predicted or inter-predicted, adds a prediction image of that block that either the inter-prediction unit 608 or the intra-prediction unit 610 outputted and a difference signal of the block, and reproduces the block. The addition unit 606 outputs the reproduced block to the intra-prediction unit 610 and the in-loop filter 614. By using the reproduced block, the intra-prediction unit 610 performs intra-frame prediction and generates an intra-prediction image. The in-loop filter 614 is, for example, a de-blocking filter. When the in-loop filter 614 receives all blocks in one frame, it generates a locally-decoded image corresponding to the frame, and outputs it to the frame buffer 612. The locally-decoded image is used in inter-frame prediction in the inter-prediction unit 608 and simultaneously outputted to the display apparatus 104 as output moving image data.

The operation of the moving image encoding apparatus 110 and the BS transformation apparatus 112 according to the foregoing configuration will be described.

Figure 7:
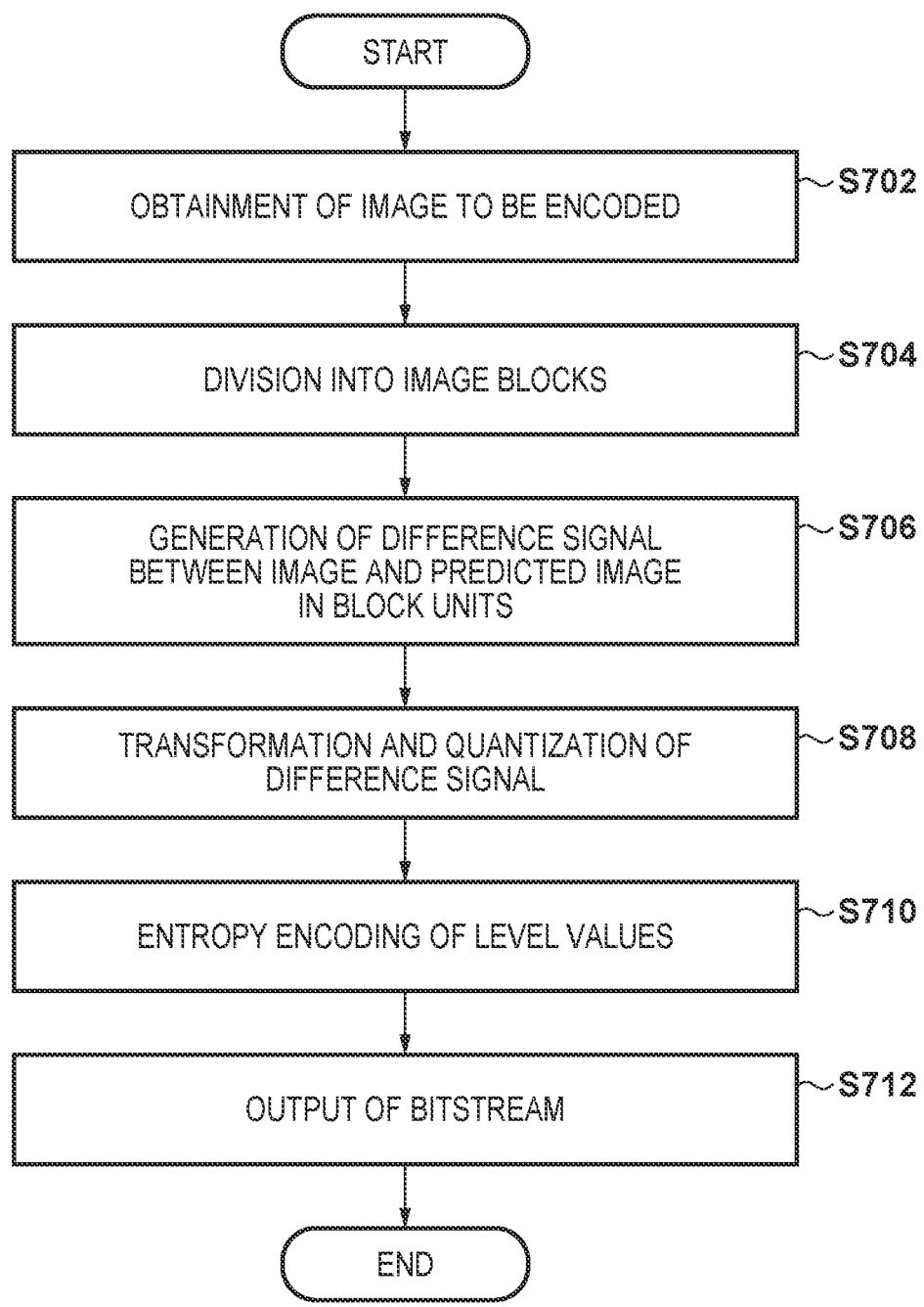
FIG. 7 is a flowchart illustrating a sequence of processes for generating a bitstream in the moving image encoding apparatus of FIG. 1.

FIG. 7 is a flowchart illustrating a sequence of processes for generating the bitstream BS in the moving image encoding apparatus 110 of FIG. 1. The moving image encoding apparatus 110 obtains an image to be encoded (step S702). The moving image encoding apparatus 110 divides the obtained image to be encoded into a plurality of blocks (step S704). The moving image encoding apparatus 110 computes a difference between the image to be encoded and a prediction image in divided block units, and generates a difference signal (step S706). The moving image encoding apparatus 110, in units of blocks, after having performed an orthogonal transformation on the difference signal, performs quantization based on a predetermined quantization parameter (step S708). The moving image encoding apparatus 110 entropy encodes the first level values obtained as the result of the quantization, and generates the bitstream BS (step S710). The moving image encoding apparatus 110 outputs the generated bitstream BS (step S712).

Figure 8:
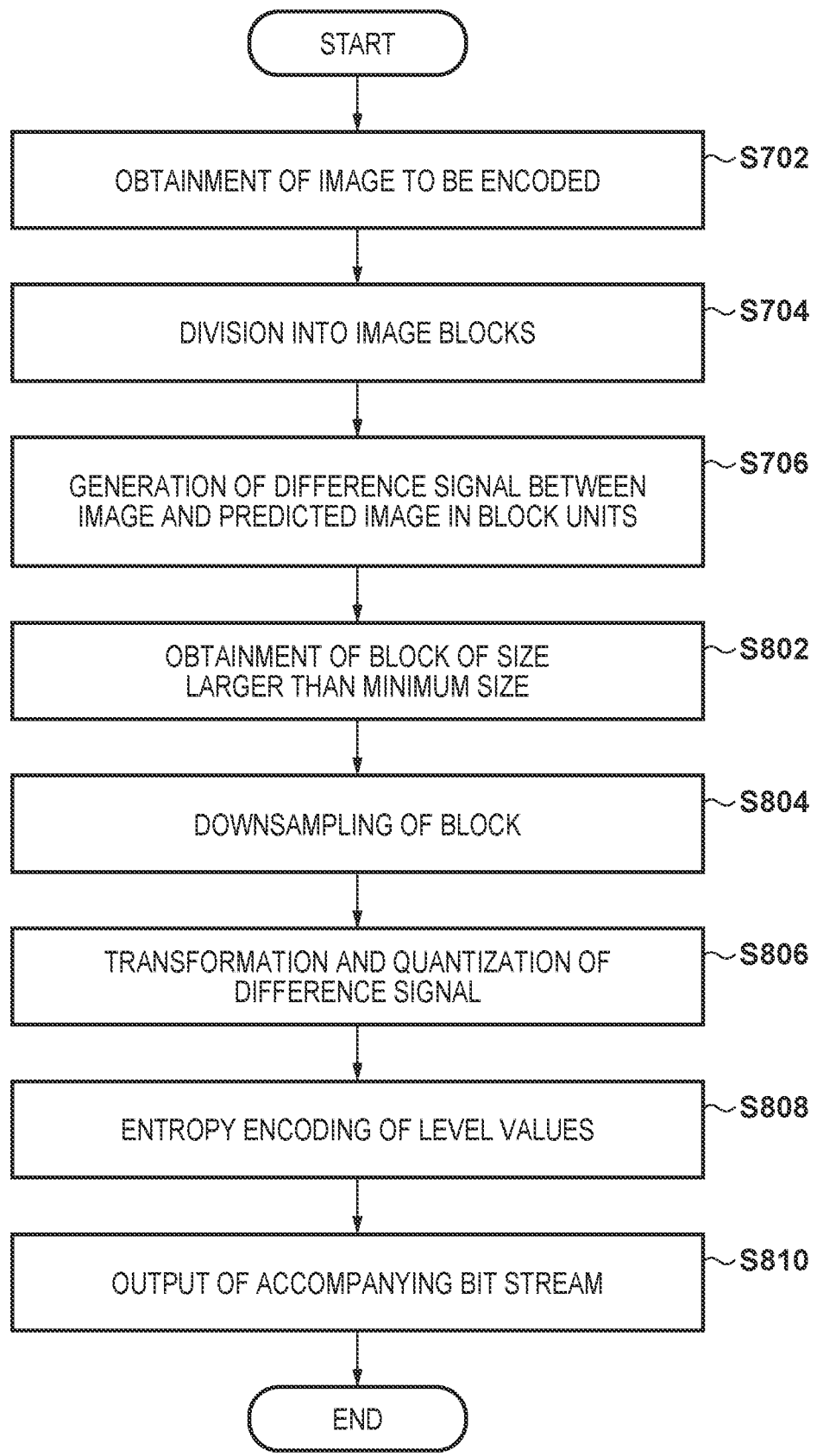
FIG. 8 is a flowchart illustrating a sequence of processes for generating the accompanying bitstream in the moving image encoding apparatus of FIG. 1.

FIG. 8 is a flowchart illustrating a sequence of processes for generating the accompanying bitstream ABS in the moving image encoding apparatus 110 of FIG. 1. The moving image encoding apparatus 110 obtains a block whose size is larger than the minimum size (step S802). The moving image encoding apparatus 110 downsamples the obtained block, and generates a minimum size block whose resolution is ½ the resolution of the image to be encoded (step S804). The moving image encoding apparatus 110, after having performed an orthogonal transformation on the difference signal for the generated minimum size block, performs quantization based on a predetermined quantization parameter (step S806). The moving image encoding apparatus 110 entropy encodes the second level values obtained as the result of the quantization, and generates the accompanying bitstream ABS (step S808). The moving image encoding apparatus 110 attaches the generated accompanying bitstream ABS to the bitstream BS and outputs it (step S810).

Figure 9:
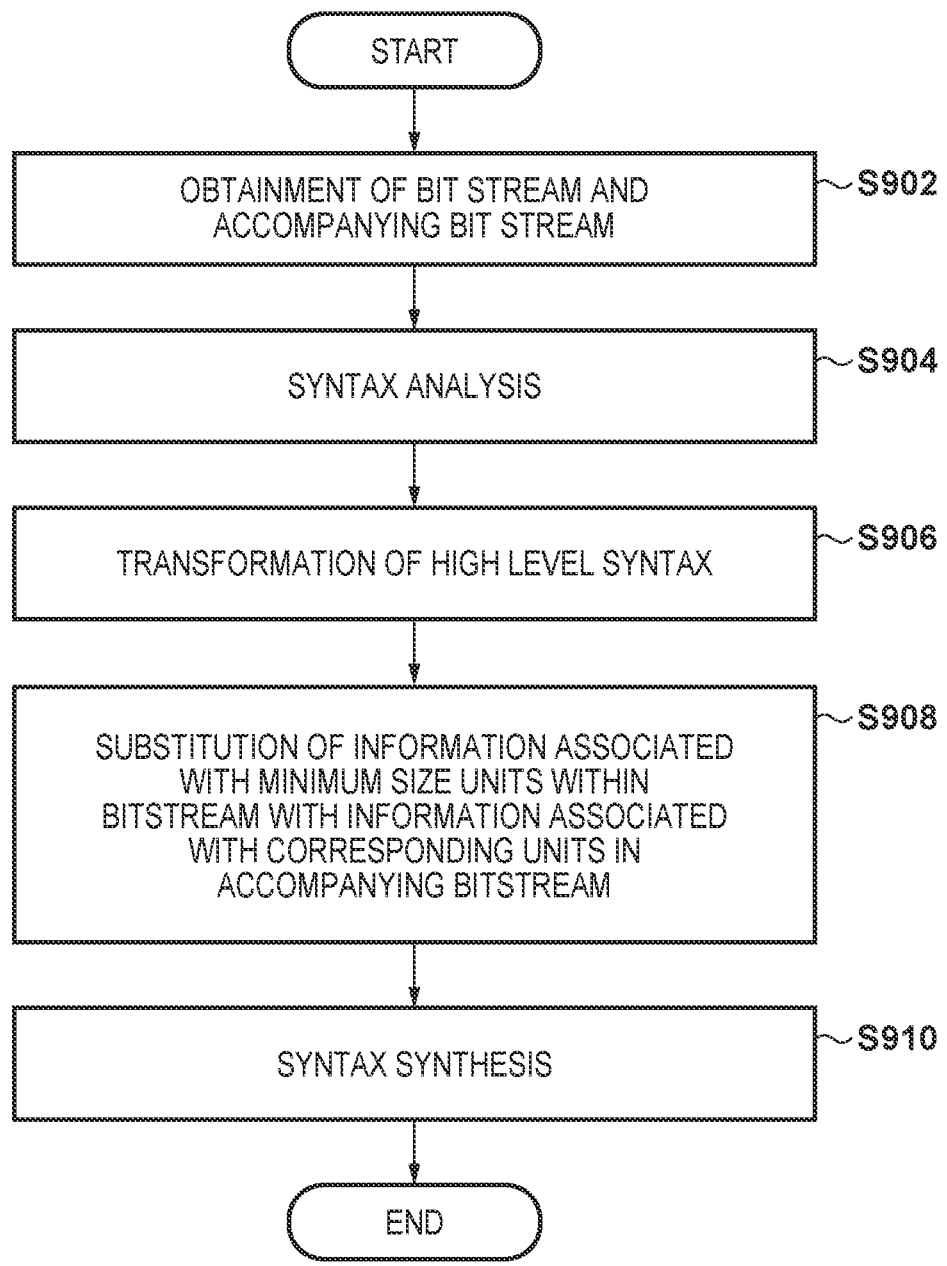
FIG. 9 is a flowchart illustrating a sequence of processes in the BS transformation apparatus of FIG. 1.

FIG. 9 is a flowchart illustrating a sequence of processes in the BS transformation apparatus 112 of FIG. 1. The BS transformation apparatus 112 obtains the bitstream BS and the accompanying bitstream ABS from the moving image storage server 101 (step S902). The BS transformation apparatus 112 analyzes the syntax of the obtained bitstream BS and the syntax of the accompanying bitstream ABS (step S904). The BS transformation apparatus 112 transforms the high-level syntax extracted from the bitstream BS according to the syntax analysis so that the resolution becomes ½, and obtains new high-level syntax (step S906). The BS transformation apparatus 112 replaces the CU information, the PU information, and the TU information associated with the minimum size CU, PU, and TU in the bitstream BS with the CU information, the PU information, and the TU information associated with the corresponding minimum size CU, PU, and TU in the accompanying bitstream ABS (step S908). The BS transformation apparatus 112 synthesizes new high-level syntax and the CU information, the PU information, and the TU information after the replacement in accordance with syntax, and generates a new bitstream NBS (step S910).

By the distribution system 100 according to the present embodiment, a scalable encoding scheme that reduces the processing amount in signal processing can be implemented. For example, it is possible to generate a bitstream of a low-resolution video by adding the accompanying bitstream to the high-resolution video on the encoding side. By this, separate encoding of low-resolution video becomes unnecessary. Because it is not necessary to prepare an apparatus or circuit for changing the resolution of the video received on the decoding side, it is possible to simplify the apparatus configuration.

Effects of the present embodiment will be described with reference to a comparative example. The comparative example is related to a scalable encoding scheme (for example, refer to NPTL1). This is a method of encoding/decoding a base video called a base layer and an extension video for which an extension portion called an enhancement layer is added to the base video and various elements are extended. As the various elements, there is a frame rate, a resolution, a bit depth, a color gamut, or the like. The comparative example relates to spatial scalability which is scalability of resolution in particular.

Figure 10:
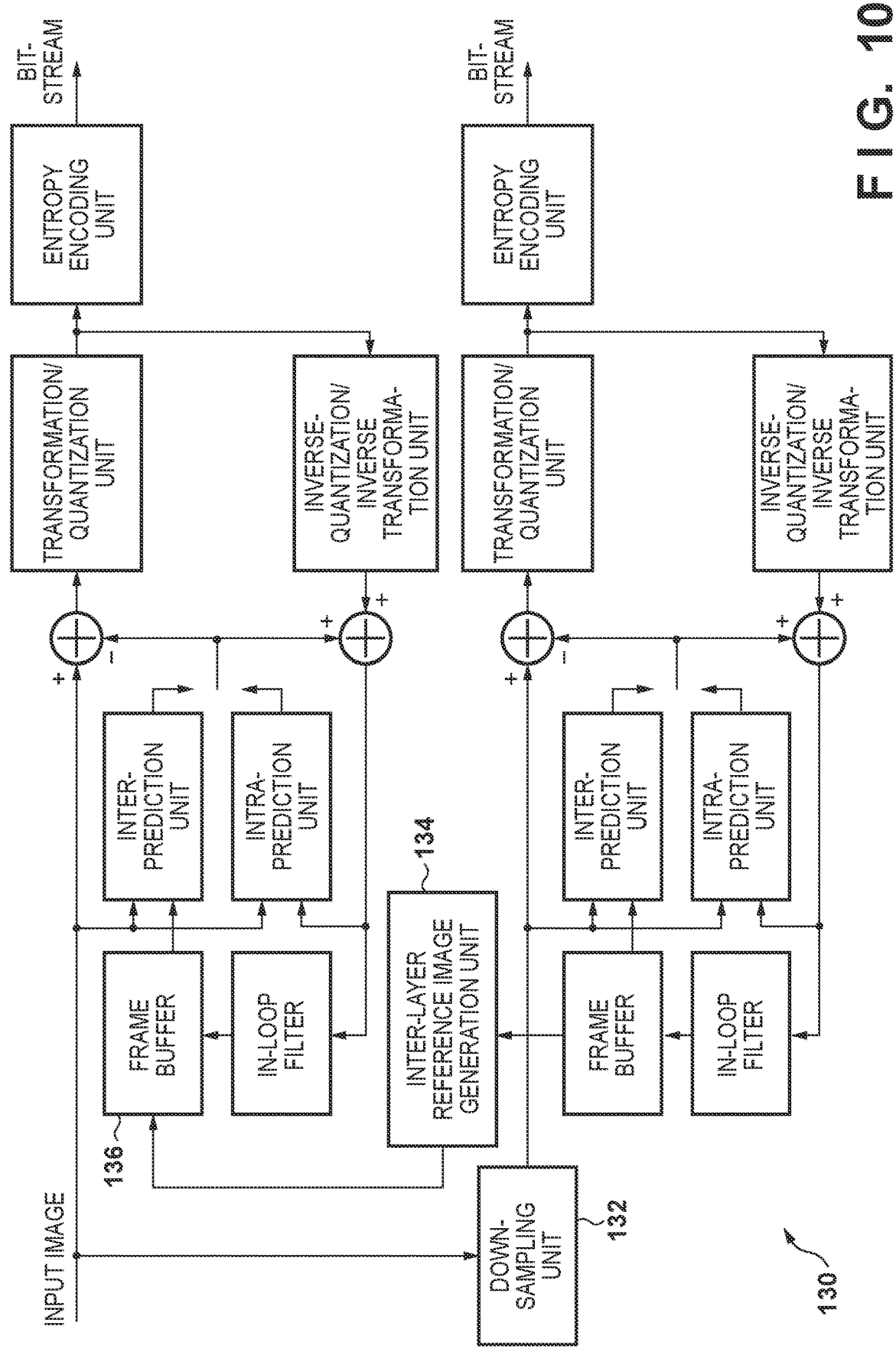
FIG. 10 is a block diagram illustrating functions and configurations of a scalable encoding apparatus according to a comparative example.

FIG. 10 is a block diagram illustrating functions and configurations of a scalable encoding apparatus 130 according to a comparative example. A downsampling unit 132 takes an input image as input, and outputs an image whose resolution is made to be ½. A video whose resolution is ½ is encoded similarly to in a normal encoding apparatus. An inter-layer reference image generation unit 134 takes a decoded image as input, and outputs a 2-times enlarged image to a frame buffer 136. The result of this is that it is possible to use a base layer image as the reference image in enhancement layer encoding, and encoding efficiency is improved over individually encoding each.

Figure 11:
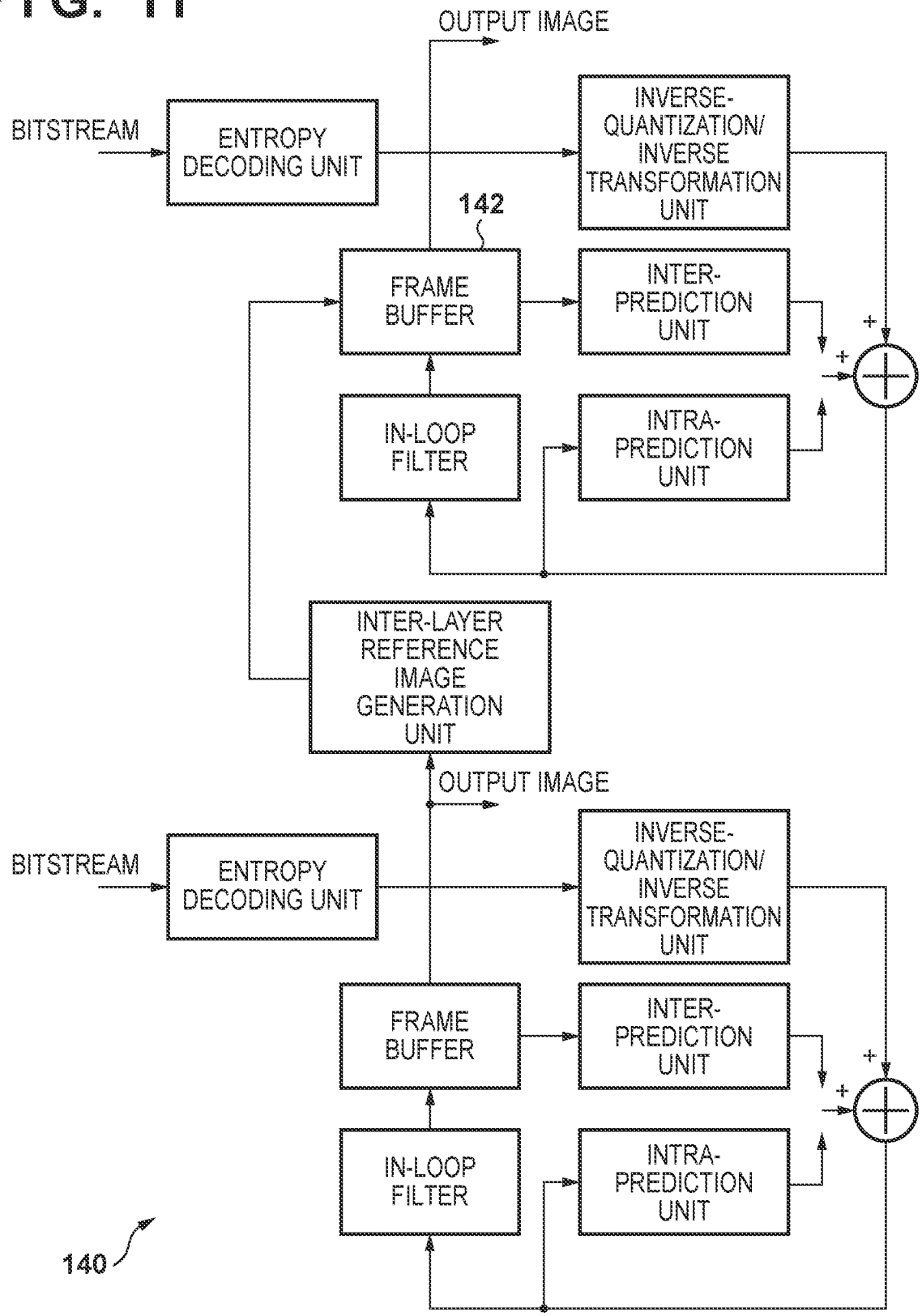
FIG. 11 is a block diagram illustrating functions and configurations of a scalable decoding apparatus according to a comparative example.

FIG. 11 is a block diagram illustrating functions and configurations of a scalable decoding apparatus 140 according to a comparative example. The case of decoding only the base layer is the same as with a conventional decoding apparatus. Meanwhile, when decoding until the enhancement layer, an inter-layer prediction image is added to a reference image buffer 142 of the enhancement layer.

As is clear from the circuit configurations illustrated in FIG. 10 and FIG. 11, in the scalable encoding/decoding scheme according to the comparative example, a plurality of encoding loops/decoding loops (for example, for low resolution and for high resolution) are needed. Accordingly, the memory bandwidth and processing amount needed for signal processing increases in proportion to the sum total of the number of pixels of all layers. In contrast to this, in the scheme according to the present embodiment, a low-resolution video bitstream (of, for example, 4K video) is generated in syntax processing from the high-resolution video bitstream (of, for example, 8K video). Accordingly, both the high-resolution video and the low-resolution video can be decoded by a single loop decoding apparatus, and it is possible to reduce the memory bandwidth and processing amount. Also, power consumption can be reduced.

Also, in the scheme according to the present embodiment, since the resolution is changed at the syntax level, it is possible to reduce the processing amount compared to a case where the resolution is changed at the signal level.

Examples of the database in the above-described embodiment are a hard disk and a semiconductor memory. Also, based on the description in the present specification, a person having ordinary skill in the art who has come into contact with the present specification will understand that it is possible to implement each unit by a CPU that is not shown graphically, a module of an application program that is installed, a module of a system program, a semiconductor memory that temporarily stores contents of data read out from a hard disk, or the like.

This concludes the description of the configuration and operation of the distribution system 100 according to the embodiment. A person having ordinary skill in the art will understand that the embodiment is only an example, and different variations are possible in each combination of the configuration elements and the processes, and that such variations are within the scope of the present invention.

In the embodiment, a case in which the distribution system 100 which is the encoding side comprises the BS transformation apparatus 112 was described, but limitation is not made to this, and the BS transformation apparatus may be provided on the decoding side. For example, the BS transformation apparatus provided at the user site may receive an 8K video bitstream and an accompanying bitstream via the network 106, and generate a 4K video bitstream in the syntax processing.

Note, the present invention is not limited to the embodiments described above, and it is possible to make various modifications or changes without straying from the spirit and scope of the present invention. Accordingly, the following claims are attached to make public the scope of the present invention.

The invention claimed is:

1. A bitstream transformation apparatus, comprising:
a syntax analysis unit that analyzes syntax of a bitstream corresponding to moving image data for which a minimum size of a unit according to decoding processing is defined and syntax of an accompanying bitstream that accompanies the bitstream, the bitstream syntax including high level syntax and information related to at least one of block division, an intra-prediction mode, motion vectors, and level values;
a high-level syntax transformation unit that transforms the high-level syntax obtained as a result of the analysis by the syntax analysis unit into new high-level syntax including a resolution that is lower than a resolution that the high-level syntax includes;
a unit transformation unit that transforms the information which is obtained as a result of the analysis by the syntax analysis unit and is associated with only the minimum size unit in the bitstream into information associated with a corresponding unit in the accompanying bitstream; and
a syntax synthesizing unit that synthesizes, in accordance with syntax, the new high-level syntax from the high-level syntax transformation unit and the information after the transformation in the unit transformation unit, and generates a new bitstream having a resolution that is lower than a resolution of the bitstream.

2. The bitstream transformation apparatus according to claim 1, wherein the high-level syntax transformation unit includes, in the new high-level syntax, a resolution obtained by dividing the resolution included in the high-level syntax obtained as a result of the analysis by the syntax analysis unit by 2 to the power of n (where n is a natural number).

3. The bitstream transformation apparatus according to claim 1, wherein the unit transformation unit discards the information associated with the minimum size unit in the bitstream, and instead outputs information associated with a corresponding unit in the accompanying bitstream.

4. The bitstream transformation apparatus according to claim 1, wherein the unit includes a coding unit.

5. The bitstream transformation apparatus according to claim 1, wherein
the unit includes a prediction unit,
the unit transformation unit transforms an accuracy of motion vectors associated with a prediction unit of a size that is larger than a minimum size in the bitstream into an accuracy in accordance with the lower resolution.

6. The bitstream transformation apparatus according to claim 1, wherein
the unit includes a transform unit,
the unit transformation unit transforms a set of the level values associated with a transform unit of a size that is larger than a minimum size in the bitstream into a set of level values in accordance with the lower resolution.

7. The bitstream transformation apparatus according to claim 6, wherein the unit transformation unit generates the set of level values in accordance with the lower resolution by extracting a low-frequency component from the set of the level values associated with the transform unit of a size that is larger than a minimum size in the bitstream.

8. The bitstream transformation apparatus according to claim 1, wherein the bitstream can be decoded by a predetermined decoding apparatus but decoding by the predetermined decoding apparatus of only the accompanying bitstream is not possible.

9. A distribution system, comprising:
the bitstream transformation apparatus according to claim 1, and
a selection unit that selects a new bitstream generated by the bitstream transformation apparatus when there is a request that the lower resolution is desired.

10. A bitstream transformation method, comprising:
analyzing syntax of a bitstream corresponding to moving image data for which a minimum size of a unit according to decoding processing is defined and syntax of an accompanying bitstream that accompanies the bitstream, the bitstream syntax including high level syntax and information related to at least one of block division, an intra-prediction mode, motion vectors, and level values;
transforming high-level syntax obtained as a result of the analysis into new high-level syntax including a resolution that is lower than a resolution that the high-level syntax includes;
transforming the information which is obtained as a result of the analysis and is associated with only the minimum size unit in the bitstream into information associated with a corresponding unit in the accompanying bitstream; and
synthesizing, in accordance with syntax, the new high-level syntax and the information after the transformation, and generating a new bitstream having a resolution that is lower than a resolution of the bitstream.

11. A non-transitory computer-readable storage medium comprising a program for causing a computer to function as the bitstream transformation apparatus according to claim 1.

* * * * *